United States Patent

[11] 3,537,520

| [72] | Inventor | LeRoy W. Holm, Fullerton, California |
|---|---|---|
| [21] | Appl. No. | 754,474 |
| [22] | Filed | Aug. 21, 1968 |
| [45] | Patented | Nov. 3, 1970 |
| [73] | Assignee | Union Oil Company Of California Los Angeles, California a corporation of California |

[54] FLOODING PROCESS FOR THE RECOVERY OF OIL
4 Claims, No Drawings

| [52] | U.S. Cl. | 166/273 |
|---|---|---|
| [51] | Int. Cl. | E21b 43/22 |
| [50] | Field of Search | 166/273, 274, 275, 305; 252/8.55(D) |

[56] References Cited
UNITED STATES PATENTS

| 3,254,714 | 6/1966 | Gogarty et al. | 166/274 |
|---|---|---|---|
| 3,348,611 | 10/1967 | Reisberg | 166/274X |
| 3,163,214 | 12/1964 | Csaszar | 166/274 |
| 3,292,696 | 12/1966 | Sandiford | 166/273 |
| 3,297,085 | 1/1967 | Herring | 166/273 |
| 3,324,944 | 6/1967 | Poettmann | 166/273 |
| 3,356,138 | 12/1967 | Davis et al. | 166/274 |
| 3,406,754 | 10/1968 | Gogarty | 166/273 |
| 3,412,791 | 11/1968 | Gogarty | 166/273 |

*Primary Examiner*—Stephen J. Novosad
*Attorney*—Milton W. Lee, Richard C. Hartman, Lannas S. Henderson, Dean Sandford and Robert E. Strauss ABSTRACT: A process for the recovery of oil from subterranean reservoirs in which a substantially anhydrous soluble oil miscible with the reservoir oil is injected into the reservoir through an injection well, and thereafter a thickened aqueous flooding medium is injected to drive the soluble oil towards a production well spaced apart in the reservoir from the injection well.

FLOODING PROCESS FOR THE RECOVERY OF OIL

This invention relates to the recovery of oil from subterranean petroleum reservoirs, and more particularly to an improved flooding process for the recovery of petroleum.

It has long been recognized that substantial amounts of oil remain unrecovered at the completion of normal primary recovery operations. Hence, various secondary methods of recovering additional quantities of oil have been proposed, such as the well-known technique of water flooding in which water is injected into the reservoir through an injection well to drive additional oil toward one or more production wells spaced apart in the reservoir from the injection well. Although an additional quantity of oil can be recovered by water flooding, the efficiency of the water flood and the ultimate oil recovery can be further improved by introducing a solvent that is miscible with both the connate oil and with the flood water into the reservoir ahead of the flood water. Alcohols and various other organic solvents have been proposed as suitable miscible agents for use in a miscible flooding operation.

Another solvent system miscible with the reservoir oil, but not with water that has been suggested for use with a water drive and which is superior to the truly miscible solvents, comprises a mixture of substantially anhydrous soluble oil and an inert, nonaqueous solvent, preferably admixed in such proportions that the viscosity of the mixture approximates the viscosity of the formation oil. The soluble oil consists of a hydrocarbon phase; one or more soaps or nonsoap surface active materials; and a stabilizing agent which is usually a monohydric or polyhydric alcohol, or other partially oxygenated, low molecular weight hydrocarbon, such as a ketone. The soluble oil often contains some free organic acid, and especially a fatty acid, such as oleic acid. These soluble oils are miscible in all proportions with the reservoir oil, and form microemulsions on contacting the flood water and connate water in the reservoir.

It has also been proposed that the flood water be preceded by a microemulsion consisting of a soluble oil containing substantial quantities of water, such as from about 10 to 50 percent or more water. These microemulsions are relatively stable, transparent emulsions of the water-in-oil type, i.e., oil is the continuous phase and small droplets of water are dispersed therein. Also, the use of oil-external emulsion systems followed by water-external emulsions, or by thickened flood water has been proposed.

While the foregoing techniques are effective in recovering more oil than recovered by conventional water flooding, it is nevertheless desirable to even further improve the miscible flooding process to reduce its cost and to recover additional amounts of oil.

Accordingly, a principal object of this invention is to provide an improved flooding process for the recovery of petroleum from subterranean reservoirs. Another object of the invention is to provide an improved combination of flooding agents for use in a flooding process for the recovery of oil. Other objects and advantages of the invention will be apparent from the following description.

Briefly, this invention contemplates a process for recovering oil from subterranean reservoirs in which a slug of substantially anhydrous soluble oil is injected into the reservoir through an injection well, and thereafter thickened flood water is injected to drive the soluble oil slug towards a production well spaced apart in the reservoir from the injection well. In another embodiment of the invention, the anhydrous soluble oil slug is followed by a substantially larger slug of thickened flood water, and then by flood water.

More specifically, this invention involves a flooding process in which oil is displaced from a subterranean oil-bearing reservoir by a slug of substantially anhydrous soluble oil displaced through the reservoir by flood water thickened by the addition of an agent that reduces its mobility. In the practice of the invention, a slug of substantially anhydrous soluble oil is injected into the reservoir through one or more injection or input wells penetrating the oil-bearing formation and forced through the reservoir by the subsequently injected thickened flood water toward at least one production or output well similarly completed in the reservoir. The thickened flood water can be followed by the injection of flood water. As the flooding medium passes through the reservoir, it displaces residual oil therein and moves it into the producing well whereupon the oil can be recovered by conventional means. The injection and production wells can be arranged in any convenient pattern designed to achieve maximum contact of the oil-bearing zones by the advancing flood front, such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

The soluble oils used herein are oleaginous compositions which are miscible in all proportions with the reservoir oil and have the ability to spontaneously emulsify with water when admixed therewith, their emulsibility with water depending in part upon the salt content of the water, lower salt content water being more readily emulsified. These soluble oils comprise a liquid hydrocarbon, one or more selected surface active agents, and optionally, a stabilizing agent. The emulsions formed by the addition of water to a soluble oil are of the water-in-oil type, in that, at water concentrations less than the inversion concentration, oil is the continuous phase and the water is dispersed in the oil in the form of very fine droplets, or micelles, which are less than about 0.1 micron in size, and usually range in size from about 100 to 600 angstroms. These emulsions are generally transparent in appearance, and are stable in that they remain as microemulsions on aging, and do not separate into visably distinct separate phases on storage at temperatures within a specified range depending on the particular soluble oil composition. By transparent, it is meant that the microemulsions do not have a cloudy or opaque appearance, even though they may contain color bodies. It is recognized, of course, that some cloudiness may appear at certain water concentrations without adversely effecting the utility of the microemulsion. Emulsions of this type are designated microemulsions to distinguish them from ordinary water-in-oil macroemulsions in which the lower limit in the size of the water droplets is about 0.1 micron. At water concentrations above the inversion concentration, the emulsion inverts to an emulsion of the oil-in-water type in which droplets of oil are dispersed in a continuous water phase.

One of the major constituents of the soluble oil composition useful in the practice of this invention is a liquid hydrocarbon, which can comprise a crude petroleum oil, such as a crude oil previously recovered from the reservoir, or other conveniently available crude oil; a refined or semirefined petroleum product, such as gasoline, naphtha, stove oil and diesel; a residual product obtained by the distillation of lower boiling fractions from a crude oil, such as bunker fuel oil and other residual products; a low value refinery byproduct, such as catalytic cycle oil, lube oil extract, and the like; and liquefied normally gaseous hydrocarbons, such as propane, butane and LPG. While soluble oils can be prepared from any of these hydrocarbons, or mixtures of different hydrocarbons, in many miscible flooding operations it is preferred to use a soluble oil compounded with petroleum crude oil, such as crude oil previously recovered from the reservoir, or with other conveniently available crude oil.

Surface active materials which can be used are those that when admixed with the liquid hydrocarbon cause the formation of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or nonpolar, groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active materials, or mixtures of materials, or mixtures of materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates, particularly the alkyl naphthenic monosulfonates. A particularly preferred surface active agent is an alkyl aryl monosulfonate prepared by sulfonation of an aromatic petroleum fraction. These sulfonates are preferably in the form of their sodium salts, however, other salts can be used.

It has been found that superior soluble oil compositions can be prepared by employing as the surface active agent a combination of preferentially oil-soluble organic sulfonates and preferentially water-soluble organic sulfonates.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonates particularly useful in the practice of this invention are oil-soluble alkyl aryl sulfonates that contain only one sulfonic group attached to an alkyl aryl hydrocarbon. The preferentially oil-soluble alkyl aryl sulfonates are those which in the form of their sodium salts have molecular weights of more than about 400. Among the preferred preferentially oil-soluble organic sulfonates are alkyl sodium benzene monosulfonates and alkyl sodium polyaryl monosulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have molecular weight of less than about 400 or which contain more than one sulfonic acid group per molecule. It has been found that in soluble oils compounded from petroleum crude oil or other high boiling hydrocarbons, superior results are obtained by employing as the preferentially oil-soluble organic sulfonate an alkyl aryl monosulfonate which in the form of its sodium salt has a molecular weight above about 450, and preferably in the range of about 450 to 550.

Thus, the soluble oil compositions of this invention are prepared by admixing into the hydrocarbon a preferentially oil-soluble organic sulfonate, such as an alkyl aryl monosulfonate or mixture of monosulfonates which in the form of their sodium salts have molecular weights of more than about 400, and a preferentially water-soluble organic sulfonate, such as an alkyl aryl sulfonate or mixture of sulfonates which in the form of their sodium salts have molecular weights of less than about 400 or which are polysulfonates. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl monosulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form the polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation, mixtures of alkyl aryl monosulfonates are produced which may be either preferentially water-soluble or preferentially oil-soluble. The term "petroleum sulfonates" is a commercial designation of sulfonates which are obtained by a treatment of petroleum fractions, particularly solvent treated aromatic fractions, with sulfuric acid, fuming sulfuric acid or sulfur trioxide, followed by neutralization to form the sulfonates. Upon sulfonation, two types of general products are formed which are designated mahogany acids and green acids. The terminology is based on the colors imparted to the respective oil and water phases produced in the sulfonation process, a brownish color being imparted to the oil phase by oil-soluble sulfonic acids and a greenish color being imparted to the aqueous phase by the water-soluble sulfonic acids. The mahogany acids and green acids can be neutralized to form mahogany sulfonates and green sulfonates. The mahogany sulfonates are preferentially oil-soluble and the green sulfonates are preferentially water-soluble.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 12 parts of oil-soluble agent per part of water-soluble agent. Although the optimum surfactant combination is dependent upon the characteristics of the particular reservoir, in many operations it is found that superior results are obtained with a surfactant combination containing about 1 to 4 parts of preferentially oil-soluble surface active material per part of preferentially water-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated organic liquids such as monohydric and polyhydric alcohols, ketones, ethers and polyhydric alkyl ethers. Specific agents found particularly useful include isopropyl alcohol, secondary butyl alcohol, methyl ethyl keton, glycol monoethyl ether (Cellosolve), glycol monobutyl ether (butyl Cellosolve), and diethylene glycol monobutyl ether (butyl Carbitol).

The soluble oils employed in the practice of this invention are substantially anhydrous in that they contain little, if any, added water. However, it is well known that some of the ingredients from which soluble oils are compounded, such as the hydrocarbon component, the stabilizing agent and the petroleum sulfonates, can contain minor proportions of water, and that it is difficult and costly to dehydrate these agents to remove all traces of water. Also, it may be advantageous when compounding the soluble oil to add a small amount of water to the composition. Thus, it is within the scope of this invention to employ anhydrous and substantially anhydrous soluble oils as the miscible displacement agent. The term "substantially anhydrous" as used herein is meant to include soluble oils having not more than minor amounts of water. More particularly, these soluble oils contain less than about 10 volume percent water, and preferably less than about 5 volume percent water. In any event, the substantially anhydrous soluble oils useful in the practice of this invention are to be distinguished from prior art microemulsions containing substantial quantities of water, such as from about 10 to 50 percent or more water.

The compositions useful in the practice of this invention can be prepared by any of the conventional techniques. One suitable method of preparing these compositions is to first admix the hydrocarbon base stock, surface active material and stabilizer in the desired proportions to form a substantially anhydrous soluble oil. Thereafter, if desired, a minor proportion of water is added to obtain a microemulsion of the desired water content. Preferably, the water employed in forming the microemulsion is a salt-containing fresh water having a dissolved salt content of less than about 5000 p.p.m.

Thus, in a preferred embodiment of this invention, a liquid hydrocarbon, such as a previously recovered reservoir oil; a surface active agent, such as a mixed alkyl aryl petroleum sulfonate; and a stabilizing agent, such as tertiary butyl alcohol, glycol alkyl ether, or other partially oxygenated organic stabilizing agent, are admixed to obtain a substantially anhydrous soluble oil comprised of 52 to 89 volume percent of liquid hydrocarbon, 9 to 30 volume percent of petroleum sulfonates, 2 to 8 volume percent of partially oxygenated organic liquid stabilizing agent, and not more than about 10 volume percent of water. Also, where the liquid hydrocarbon has a relatively high viscosity, a quantity of low viscosity, light liquid hydrocarbon can be substituted for a portion of the liquid hydrocarbon to increase the mobility of the resulting soluble oil to obtain a more favorable mobility ratio between the soluble oil slug and the following drive fluid. The liquid hydrocarbon will usually not constitute more than 25 percent by volume of the soluble oil composition.

In the practice of this invention, the soluble oil prepared in the foregoing manner is injected into the reservoir through one or more injection wells in an amount equivalent to 0.01 to 0.15 pore volume of the reservoir to be treated. Thickened aqueous flooding medium is then injected to displace the soluble oil toward at least one production well spaced apart in the reservoir, from which fluids are produced in conventional manner. The aqueous flooding medium can comprise water or brine, and is made more viscous by the addition of a thickening agent to reduce the mobility of the medium in the porous formation. In a preferred mode of practicing this invention, thickening agent is added to only an initial portion of the flood water.

The various known viscosity increasing additives which can be employed to thicken the flood water include fatty acid soaps, alginates, sucrose, dextran, amines, glycerine, finely divided clays such as montmorillonite, and a number of water-soluble polymers. Of these, the water-soluble polymers are generally preferred. Water-soluble polymers useful in the practice of this invention include guar gum, modified starches, Xanthum gum obtained by the fermentation of starch-derived sugar, alkyl and hydroalkyl cellulose derivatives, carboxymethyl cellulose, polyvinyl alcohol, polyvinyl pyrrolidone, polyacrylic acid, polyacrylamide, polystyrene sulfonates, ethylene oxide polymers, and various homologs of these polymers, and copolymers of two or more of these materials, or copolymers of the aforementioned polymers with other polymerizable substances.

One specific polymer found specially useful in thickening the aqueous flooding medium is hydroxyethyl cellulose. Another preferred polymer is a partially hydrolyzed polyacrylamide, and particularly such polymer having between about 2 to about 67 percent of the carboxamide groups hydrolyzed to carboxyl groups and characterized by a molecular weight of at least about 500,000, and preferably 1,000,000, or more. With these high molecular weight polyacrylamides, it is possible to obtain aqueous solutions having a desirably increased viscosity with the use of a minimum amount of polymeric ingredient. Further, the viscosity of a standard solution of polymer under controlled conditions is correlated with the molecular weight of the polymer. Accordingly, the hydrolyzed polyacrylamides preferred for use in this invention are those characterized by a viscosity of at least 6 centipoises for a 0.5 percent by weight solution thereof in aqueous 4 percent by weight solution at a temperature of 25°C. as determined with an Oswald viscosimeter.

The term "hydrolyzed polyacrylamide" as employed herein is inclusive of the modified polymers wherein the carboxyl groups are in the acid form and also wherein the carboxyl groups are in the salt form, provided that the salts are water-soluble. Thus, for example, the hydrolyzed polyacrylamide can be employed in the form of the sodium, potassium, or other alkali metal salt, the ammonimum salt, or mixed salts of sodium, potassium, and the like. Salts of polyvalent ions, such as calcium, magnesium, iron and aluminum, are to be avoided as these are usually insoluble in water. The polyacrylamides, from which the hydrolyzed polyacrylamides useful in this invention are derived, may be homopolymers of acrylamide or copolymers thereof with other suitable polymerizable vinyl compounds such as vinyl acetate, acrylonitrile, methyl acrylonitrile, vinyl alkyl ether, vinyl chloride, and the like, provided that the copolymers so employed are characterized by water solubility and freedom from cross linking. Particularly preferred copolymers are those formed by the copolymerization of acrylamide with maleic anhydride or acrylic acid.

The thickened aqueous flooding medium is prepared by dissolving a suitable thickening agent in water or brine in an amount sufficient to reduce the mobility of the medium to a desired value when it is passed through a porous body. In a particular application, it may be desirable to soften or deionize the water. Preferably, sufficient of the thickening agent is added to reduce the mobility of the thickened aqueous flooding medium to a value not greater than that of the soluble oil at formation conditions. Thus, it is preferred that the mobility of the thickened flood water is reduced so that the relative mobility of the soluble oil with respect to the thickened flood water, as defined by the ratio of the mobility of the soluble oil divided by the mobility of the thickened flood water, is greater than 1.0. In the case of the preferred thickening agents, mobility control can usually be achieved by the addition of about 0.002 to about 0.5 weight percent of the polymer, although in particular application, solutions containing more or less polymer can be employed where desired.

Further, it is to be understood that additional agents, such as bacteriocides, corrosion inhibitors, and water treating agents can be incorporated into the fluids injected into a subterranean formation in the practice of this invention.

In a preferred embodiment of the invention, 0.01 to 0.15 conforming pore volume of soluble oil is injected into the reservoir and followed by 0.1 to 0.8 pore volume of thickened aqueous flooding medium. Thereafter, water or brine is injected to drive the previously injected fluid toward at least one spaced production well.

As heretofore disclosed, the soluble oil injected into the reservoir is miscible in all proportions with the reservoir crude oil. Hence, it is believed that connate oil is substantially completely displaced from the reservoir by miscible displacement with the soluble oil as the soluble oil slug is driven through the reservoir. Also, connate water may be removed from the reservoir ahead of the soluble oil bank by emulsification with the soluble oil, and the soluble oil is driven through the formation by emulsification with the following flood water to form the aforementioned microemulsions. However, while the exact mechanism by which the fluids injected in the practice of this invention operate to effect recovery of oil from subterranean reservoirs is not completely understood, it has nevertheless been demonstrated that additional quantities of oil can be economically recovered by the method of this invention than by prior art recovery methods.

The invention is further described by the following examples which are illustrative of specific modes of practicing the invention and are not intended as limiting the scope of the invention as defined by the appended claims.

EXAMPLE 1

The increased oil recovery obtained by the process of this invention is illustrated in the following series of tests.

A number of 2-foot long by 1-½- inch diameter sand packs are prepared by packing Nevada 130 sand in transparent plastic tubes. The sand is first saturated with water and then with an Illinois crude oil having a viscosity of 7 cp. at test conditions. Water permeabilities of the individual sand packs are measured to insure similarity of the test cores. The oil saturations of the prepared sand packs are between 85 and 87 percent of the pore volume.

Oil recovery by a conventional waterflood with thickened flood water is illustrated by a first test designated Test No. 1A. In this test a prepared sand pack is flooded with distilled water thickened with about 0.06 weight percent of a partially hydrolyzed polyacrylamide marketed by the Dow Chemical Company under the trademark Pusher 500. The thickened flood water exhibited a viscosity of 39 cp. measured on a Brookfield Viscosimeter equipped with a standard UL adaptor and operated at a speed of 6 r.p.m. Fluids produced from the sand pack are recovered and the volume of produced oil measured. An oil recovery of 79 percent is obtained after the injection of 1 pore volume of thickened water, and 80.5 percent after the injection of 1.5 pore volume.

A second test, identified as Test No. 1B, illustrates the oil recovery obtained by the injection of a slug of soluble oil followed by conventional water drive. This test utilizes a substantially anhydrous soluble oil having the following composition:

|  | Vol. percent |
|---|---|
| Illinois crude oil | 72.0 |
| Butyl cellosolve | 6.7 |
| Petroleum sulfonates | 21.3 |

The soluble oil has a Brookfield viscosity of 23 cp. at 6 r.p.m. A slug of the soluble oil amounting to 0.10 pore volume is injected into the sand pack and subsequently driven through the sand pack with fresh water containing about 700 p.p.m. dissolved salts. The relative mobility of the soluble oil with respect to the flood water is 0.044. An oil recovery of 90.7 percent is obtained after the injection of 1 pore volume of fluid (including both the soluble oil and drive fluid), and 92 percent after the injection of 2 pore volumes of fluid. These oil recoveries are based on both the initial volume of oil-in-place and the volume of oil injected in the soluble oil slug.

Test No. 1C illustrates an embodiment of the invention wherein a slug of soluble oil is injected and displaced by the subsequent injection of a small slug of thickened water and then by flood water. A 0.10 pore volume slug of the soluble oil utilized in Test No. 1B is injected into a sand pack. Next, 0.10 pore volume of distilled water thickened as in Test No. 1A is injected and displaced through the core by the injection of fresh water. The relative mobility of the soluble oil with respect to the thickened flood water is 1.7. An oil recovery of 92.8 percent is obtained after the injection of 1 pore volume of fluid, and 93.8 percent by the injection of 1.5 pore volumes of fluid.

In the fourth test, Test No. 1D, a 0.10 pore volume slug of the same soluble oil is displaced through a sand pack with distilled water thickened as in Test No. 1A. The relative mobility of the soluble oil with respect to the thickened flood water is 1.7. An oil recovery of 97.8 percent is obtained by the injection of 1 pore volume of fluids, and 98.4 percent by the injection of 1.5 pore volumes of fluid.

The results of the above tests are summarized in table 1. These tests illustrate the advantage of an oil recovery process in which a substantially anhydrous soluble oil is displaced through a porous oil-bearing formation with thickened flood water, and also that the amount of thickened flood water employed as displacement fluid affects oil recovery.

TABLE 1

| | Soluble oil, pore volume | Drive fluid type | Oil recovery, percent OIP at— | |
|---|---|---|---|---|
| | | | 1 pore vol.[2] | 1.5 pore vol.[2] |
| Test No.: | | | | |
| 1A | None | Thickened distilled water | 79 | 80.5 |
| 1B | 0.10 | Fresh water | 90.7 | [3] 92 |
| 1C | 0.10 | 0.10 pv. thickened distilled water followed by fresh water | 92.8 | 93.8 |
| 1D | 0.10 | Thickened distilled water | 97.8 | 98.4 |

[1] Oil recovery based on the initial oil saturation and the oil content of the soluble oil injected.
[2] Based on the cumulative amount of fluids injected.
[3] Oil recovery at 2 pore volumes of fluids injected.

(1) Oil recovery based on the initial oil saturation and the oil content of the soluble oil injected.
(2) Based on the cumulative amount of fluids injected.
(3) Oil recovery at 2 pore volumes of fluids injected.

EXAMPLE 2

This example illustrates the increased oil recovery obtainable by the method of this invention over that obtained by displacing an oil-external emulsion with thickened flood water.

A sand pack is prepared and saturated with Illinois crude oil as described in example 1. Final oil saturation is 82.5 percent of the pore volume. In this test, the sand pack is flooded with a 0.10 pore volume slug of an oil-external microemulsion having the following composition:

|  | Vol. percent |
|---|---|
| Gasoline | 48.6 |
| Isopropyl alcohol | 6.1 |
| Petroleum sulfonates | 12.9 |
| Water | 32.4 |

The emulsion is then displaced through the sand pack by injecting thickened flood water. Fluids produced from the sand pack are recovered and the volume of produced oil measured. An oil recovery of 89 percent based on the volume of the oil-in-place and the volume of oil injected in the emulsion is obtained by the injection of 1 pore volume of fluids, and 92.3 percent by the injection of 1.3 pore volumes of fluid.

The test is repeated on a second sand pack using as the miscible slug 0.10 pore volume of a substantially anhydrous soluble oil having the following composition:

|  | Vol. percent |
|---|---|
| Illinois crude oil | 72.0 |
| Butyl cellosolve | 6.7 |
| Petroleum sulfonates | 21.3 |

The soluble oil slug is displaced through the formation with thickened flood water. An oil recovery of 90 percent is obtained by the injection of 1 pore volume of fluids, and 95.5 percent by the injection of 1.3 pore volumes. The results of this test are summarized in table 2.

TABLE 2

| Oil-miscible slug | Oil recovery, percent OIP[1] at— | |
|---|---|---|
|  | 1 pore vol. | 1.3 pore vol. |
| Oil-external microemulsion | 89 | 92.3 |
| Anhydrous soluble oil | 90 | 95.5 |

[1] Oil recovery based on the initial oil saturation and the oil content of the soluble oil injected.

(1) Oil recovery based on the initial oil saturation and the oil content of the soluble oil injected.

EXAMPLE 3

The increased oil recovery obtained with the process of this invention employed in a tertiary oil recovery operation is illustrated by the following tests.

A number of 2-foot long by 2-inch diameter sand packs are prepared by packing Nevada 130 sand in transparent plastic tubes. The sand is first saturated with brine and then with an Illinois crude oil having a viscosity of about 7 cp. at test conditions. Water permeablities of the individual sand packs are measured to ensure similarity of the test cores. The sand packs are then flooded with brine to a residual oil saturation of 28 to 30 pore volume percent to simulate a water flooded reservoir. An oil-miscible displacement fluid is injected into the sand pack and driven through the sand pack by the subsequent injection of a thickened aqueous flooding agent or by flood water. The fluids produced from the sand pack are recovered and the volume of produced oil measured.

In a first test of the tertiary flood, 0.025 pore volume of an oil-external microemulsion is injected into the sand pack and displaced therethrough by the subsequent injection of 0.40 pore volume of flood water thickened by the addition of 0.2 weight percent of partially hydrolyzed polyacrylamide marketed by the Dow Chemical Company under the trademark Pusher 500. The oil-external emulsion has the following composition:

|  | Vol. percent |
|---|---|
| Illinois crude oil | 54 |
| Butyl cellosolve | 5 |
| Petroleum sulfonates | 16 |
| Water | 25 |

The emulsion exhibited a Brookfield viscosity of 26.9 cp. at 6 r.p.m., and the thickened flood water a viscosity of 32.8 cp. at 6 r.p.m. An oil recovery of 72.6 percent of the residual oil is obtained by the injection of 1 pore volume of fluids and 76.7 percent by the injection of 1.5 pore volumes.

A second test is performed employing 0.025 pore volume of anhydrous soluble as the miscible displacement fluid, and driving the soluble oil through the sand pack with conventional flood water. The soluble oil exhibits a Brookfield viscosity of 21.4 cp. at 6 r.p.m., and exhibits the following composition:

|  | Vol. percent |
|---|---|
| Illinois crude oil | 69.2 |
| Butyl cellosolve | 6.4 |
| Petroleum sulfonates | 20.4 |
| Water | 4.0 |

This test recovered 11 and 14 percent of the residual oil, respectively, by the injection of 1 and 1.5 pore volumes of fluids.

A third test is performed to demonstrate one mode of practicing the process of this invention. In this test 0.025 pore volume of the substantially anhydrous soluble oil employed in the second test is injected into a sand pack and displaced therethrough with 0.40 pore volumes of the thickened flood water employed in the first test, followed by conventional water drive with brine. Oil recoveries of 79.5 and 84.5 percent of the original oil were obtained by the injection of 1 and 1.5 pore volumes of fluids, respectively.

A fourth test is conducted using an anhydrous soluble oil having the following composition:

|  | Vol. percent |
|---|---|
| Illinois crude oil | 72.0 |
| Butyl cellosolve | 6.7 |
| Petroleum sulfonates | 21.3 |

The Brookfield viscosity of the soluble oil is 20.5 cp. at 6 r.p.m. A 0.025 pore volume slug of soluble oil is injected into the sand pack and followed with 0.40 pore volume of the thickened flood water employed in the first test, and the injected fluids displaced with brine. An oil recovery of 85 percent of the residual oil is obtained by the injection of 1 pore volume of fluid, and 90.8 percent by the injection of 1.3 pore volumes of fluid.

The results of the above tests are summarized in table 3.

TABLE 3

| Oil-miscible slug | | | | Oil recovery, percent OIP[1] at— | |
|---|---|---|---|---|---|
| Type | Pore vol. | Drive fluid | | 1 pore vol.[2] | 1.5 pore vol.[2] |
| Oil-external microemulsion | 0.025 | 0.40 PV thickened flood water followed by brine | | 72.6 | 76.7 |
| Substantially anhydrous soluble oil | 0.025 | Brine | | 11.0 | 14.0 |
| Do | 0.025 | 0.40 PV thickened flood water followed by brine | | 79.5 | 84.5 |
| Anhydrous soluble oil | 0.025 | do | | 85.0 | [3]90.8 |

[1] Oil recovery based on the residual oil saturation after conventional water flooding and the oil content of the soluble oil.
[2] Based on the cumulative amount of fluids injected.

These data illustrate the increased oil recovery obtainable by the process of this invention wherein an anhydrous or substantially anhydrous soluble oil is injected into the oil-bearing medium and displaced therethrough with thickened flood water.

EXAMPLE 4

An oil recovery operation is conducted on an oil-containing reservoir in accordance with the method of this invention. Four injection wells are arranged in a rectangular pattern around a single centrally located production well. A substantially anhydrous soluble oil comprised of 68 volume percent hydrocarbon, 21 volume percent petroleum sulfonates, 7 volume percent of partially oxygenated organic stabilizer, and 4 volume percent water is injected into the reservoir in an amount equivalent to 0.05 pore volume. Next, 0.50 pore volume of aqueous flooding medium thickened by the addition of 0.15 weight percent of hydroxyethyl cellulose marketed by the Hercules Powder Company under the trademark Natrasol 250 is injected and driven through the formation by the subsequent injection of flood water. Oil and other produced fluids are recovered from the central producing well.

Various embodiments and modifications of this invention have been described in the foregoing description and examples, and further modifications will be apparent to those skilled in the art. Such modifications are included within the scope of this invention as defined by the following claims:

I claim:

1. A method for recovering petroleum from a subterranean reservoir penetrated by an injection well and a recovery well spaced apart in the reservoir, which comprises:

injecting 0.01 to 0.15 reservoir pore volume of a soluble oil through said injection well and into said reservoir, said soluble oil being comprised of about 52 to 89 volume percent of liquid hydrocarbon, about 9 to 30 volume percent of petroleum sulfonates, about 2 to 8 volume percent of a partially oxygenated organic liquid stabilizing agent and not more than about 10 volume percent water;

thereafter injecting 0.1 to 0.8 reservoir pore volume of flood water thickened by the addition of a small amount of water-soluble polymer;

next injecting flood water to drive said previously injected fluids through said reservoir; and recovering petroleum from said production well.

2. The method defined in claim 1 wherein said water-soluble polymer is added to said flood water in an amount sufficient to reduce its mobility to a value not greater than that of the soluble oil.

3. The method defined in claim 1 wherein said water-soluble polymer is partially hydrolyzed polyacrylamide.

4. The method defined in claim 1 wherein said water-soluble polymer is hydroxyethyl cellulose.